United States Patent [19]

Steinmetz et al.

[11] Patent Number: 5,386,101

[45] Date of Patent: Jan. 31, 1995

[54] METHOD AND APPARATUS FOR WELDING TUBULAR PARTS

[75] Inventors: Hans W. Steinmetz, Schaffhausen; Dirk A. Petry, Feuerthalen, both of Switzerland

[73] Assignee: Georg Fischer Rohrleitungssysteme AG, Schaffhausen, Switzerland

[21] Appl. No.: 87,231

[22] Filed: Jul. 2, 1993

[30] Foreign Application Priority Data

Jul. 2, 1992 [CH] Switzerland ............... 02084/92

[51] Int. Cl.⁶ .................................... F16L 13/02
[52] U.S. Cl. ........................... 219/535; 156/304.2; 285/21; 285/286
[58] Field of Search ............ 219/535, 544, 547; 156/273.9, 274.2, 158, 304.2, 503, 304.6; 285/21, 22, 43, 286, 292

[56] References Cited

U.S. PATENT DOCUMENTS

| | | | |
|---|---|---|---|
| 3,432,186 | 3/1969 | Braun | 285/286 |
| 3,482,304 | 12/1969 | Brigot et al. | 285/286 |
| 3,744,823 | 7/1973 | Muir et al. | 285/21 |
| 3,770,302 | 11/1973 | Hallenbeck | 285/22 |
| 3,778,534 | 12/1973 | Jenkins | 285/286 |
| 4,135,739 | 1/1979 | Mackenzie | 285/22 |
| 4,234,368 | 11/1980 | Schwarz | 156/304.2 |
| 5,125,690 | 6/1992 | Taylor et al. | 285/22 |
| 5,320,697 | 6/1994 | Hegler et al. | 156/158 |

FOREIGN PATENT DOCUMENTS 2420713 11/1979 France .................. 285/286

Primary Examiner—Geoffrey S. Evans
Attorney, Agent, or Firm—Bachman & LaPointe

[57] ABSTRACT

For welding tubular plastic parts (1) formed as a compound tube there is used a welding element (20) which is arranged with its inner peripheral surface (23) on projections (10) of the tubular parts (1) and reciprocally centers them. The welding element (20) has an annular part (21) with a heating coil (22) on its outer contour. The heating coil (22) has coil strands laid in a zig-zag shape which are curved in a U-shape and extend transversely to the peripheral direction of the annular part (21).

15 Claims, 3 Drawing Sheets

000
METHOD AND APPARATUS FOR WELDING TUBULAR PARTS

FIELD OF THE INVENTION

The invention relates to a process for the welding of the ends of tubular parts made of, for example, plastic.

BACKGROUND OF THE INVENTION

EP0 240 732-A ("EP 732-A") discloses a process for welding butt-ended solid wall tubes of plastic. The entire end surfaces of the tubes to be welded are heated by a welding element applied between the tubes, thereby producing a undesirable welding rim on the inner circumference of the tubes. In order to keep the tubes to be joined and the welding element in alignment during welding, a special saddle part which can be placed on the outer circumference of the tubes is necessary. For compound tubes (also called double wall tubes) used recently for sewerage, for instance, the welded joint process disclosed in EP-732-A is not suitable. Tubes of this type comprise a thin-walled cylindrical inner tube and a corrugated outer tube firmly connected to the inner tube.

IT is therefore an object of the present invention to provide an apparatus and method by means of which a centred welded joint of tubular parts can be produced, without welding rims occurring on their inner circumference. Another object of this invention is to provide such an apparatus and method which should be suitable for the above mentioned compound tubes.

SUMMARY OF THE INVENTION

These and other objects of the invention, which shall become apparent, hereafter, are achieved by a method and apparatus for the end welding of plastic tubular parts. The ends of tubular parts have a projection with an end face extending from the inner circumference. A welding element with a heating coil for electrical resistance heating is applied between the ends of the tubular parts. The two tubular parts are placed onto the welding element with simultaneous mutual centering with the projection, wherein a gap is formed between the projections. A current is supplied to the resistance heating in the welding element. The plastic, at least in one partial region of the adjacently lying surfaces of the tubular parts and of the welding element is melted without melting of the inner end faces. During heating, the tubular parts are pressed against each other until the end faces act as a firm stop and abut each other. The current is switched off and then the tubular parts are retained next to each other until the welded region is hardened by chilling.

The invention will be better understood by the Detailed Description of the Preferred Embodiment, with reference to the drawings, of which:

DETAILED DESCRIPTION OF THE PREFERRED EMBODIMENT

Figure 1:
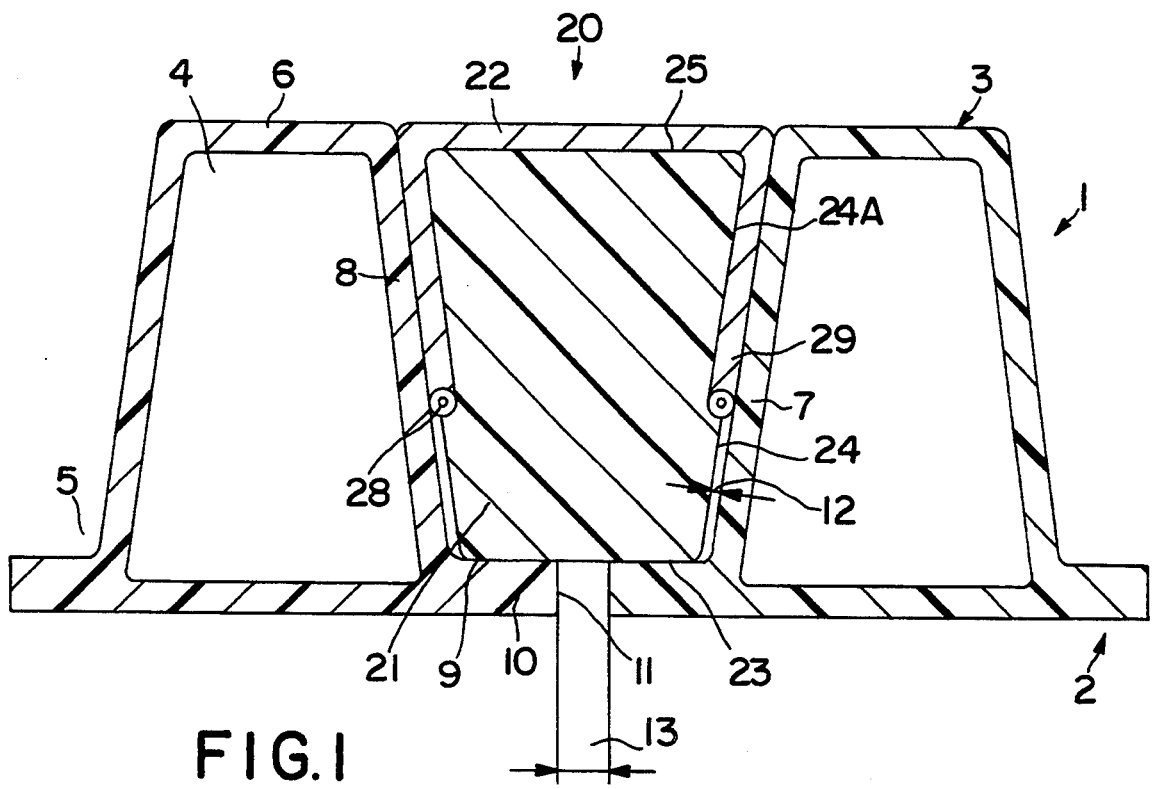
FIG. 1 depicts, in partial longitudinal section, the ends of two tubular parts constructed as compound tubes with a welding element before welding.
Figure 2:
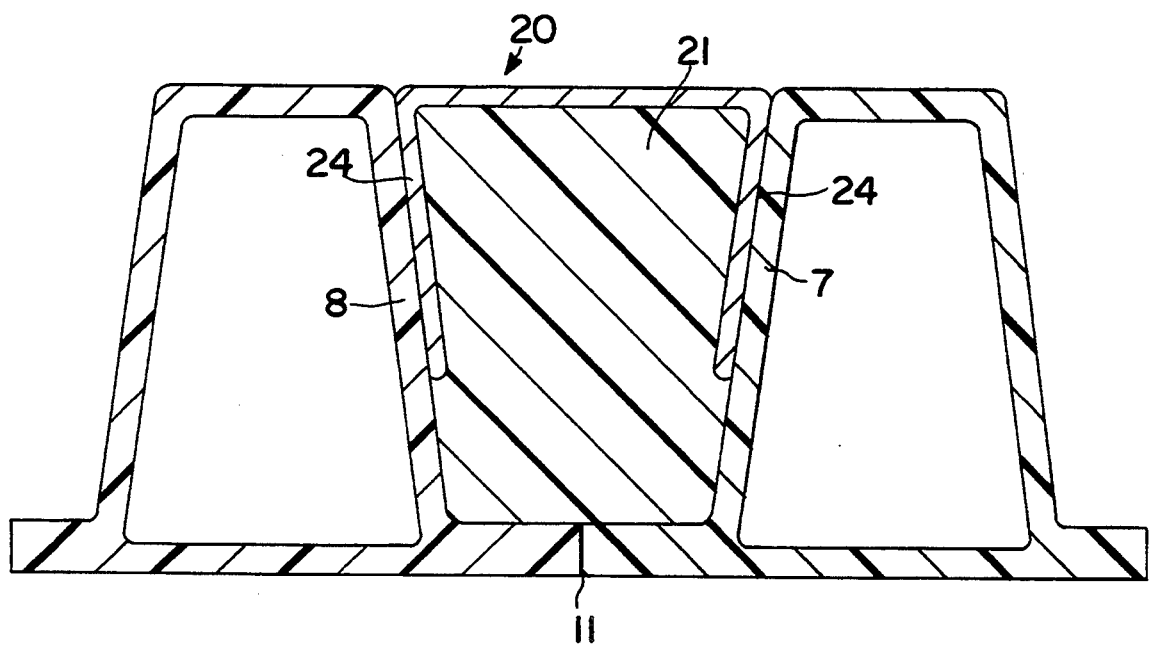
FIG. 2 depicts the ends according to FIG. 1, after welding.

Referring now to the drawings, wherein like numerals represent like elements, throughout the various views, FIGS. 1 and 2 show the ends of plastic tubular parts 1 constructed as compound tubes or corrugated tubes. Tubes of this type respectively comprise a continuous cylindrical inner tube 2 and a corrugated outer tube 3, which are joined firmly together during production. The outer tube 3 has annular corrugation peaks 4 and corrugation valleys 5 which are trapezoidal in cross-section and are each limited by an outer wall 6, the two inclined side walls 7 and 8 and the inner wall 9.

Since the end of the tubular part 1 is respectively formed for mutual joining by separation in the corrugation valley, a projection 10 is produced with an inner surface 11, composed of the inner pipe 2 and the inner wall 9.

A welding element 20, for welding the tubular part 1, comprises an annular part 21 of plastics with a heating coil 22 arranged on its outer contour.

The annular part 21 is constructed to be trapezoidal in cross-section, corresponding to one corrugation valley 5 and having two inclined side surfaces 24 of an inner peripheral surface 23 forming a centering seat, and an outer peripheral surface 25.

Figure 3:
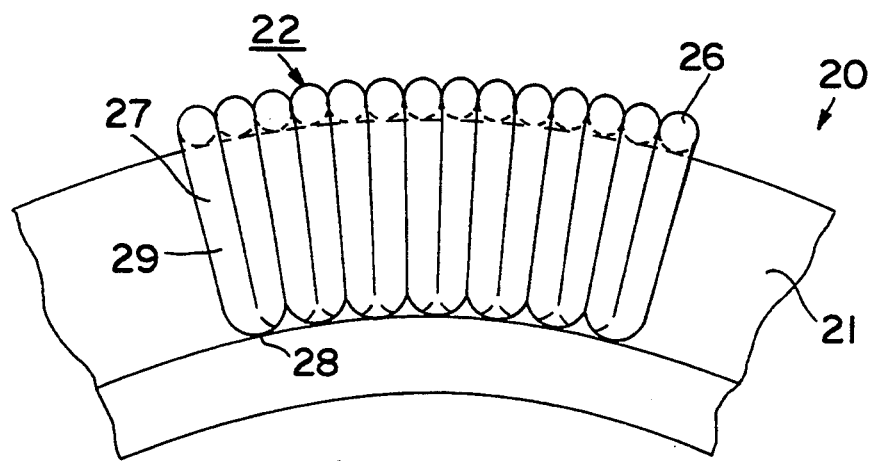
FIG. 3 depicts a partial side view of the welding element shown in FIGS. 1 and 2.

The heating coil 22 has a resistance wire 26, (see FIG. 3) wound in a wavy or zig-zag manner and coated with plastics, the coil strands 27 of which extend transversely to the peripheral direction of the annular part 21 (see also FIG. 3). The heating coil 22 has a U-shaped curve in cross-section and extends from a side surface 24 over the outer peripheral surface 25 to the other side surface 24 of the annular part 21.

On the side surfaces 24, the return ends 28 of the coil strands 27 are each spaced from the inner peripheral surface 23 and hence there is no melting, or only slight melting of the plastic in the inner region.

The two arms 29 of the U-shaped heating coil 22 lie against a surface 24A (see FIGS. 9A and 9B), offset inwardly to the side surfaces 24. The amount of offset corresponds to about half the outer diameter of the plastic coating of the resistance wire 26.

Thus, according to FIG. 1, when the welding element 20 is inserted, there is a gap 12 between the side surfaces 24 and the side walls 7 and 8.

The heating coil 22 preferably comprises two coil portions which are connected in parallel to each other and have the same or approximately the same ohmic resistance and are arranged on the semi-circumference of the annular part 21.

In order to produce the welded joint, the tubular parts 11 with their projections 10, are placed onto the welding element 20. Thus, a concentric position of the tubular parts with respect to each other is achieved by the centering seat 23. As seen in FIG. 1, a gap 13 is produced between the inner faces 11 and the already described gaps 12 are produced between the annular part 2 and the tubular parts 1.

By supplying current to the heating coil 22, the annular part 21 and the ends of the tubular parts 1 in the region of the side faces 24 and of the side walls 7, 8 are heated, so that the plastics material in these regions is plasticised.

At the same time, a reciprocal axial pressure is exerted on the tubular parts 1 until they abut each other with their inner, non-plasticised ends 11. The pressure is maintained until the plasticised material cools down and a firm welding joint, without a rim, is produced on the inner circumference of the tubular parts 1 (see FIG. 2).

Figure 4:
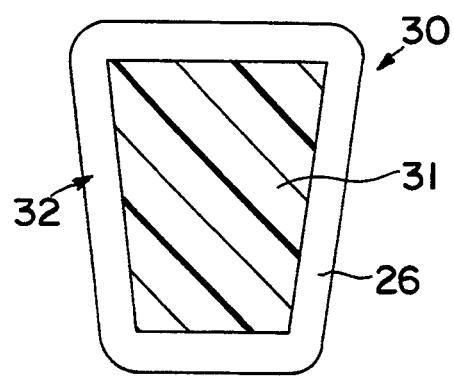
FIG. 4 depicts an embodiment variant of a welding element in cross section.
Figure 5:
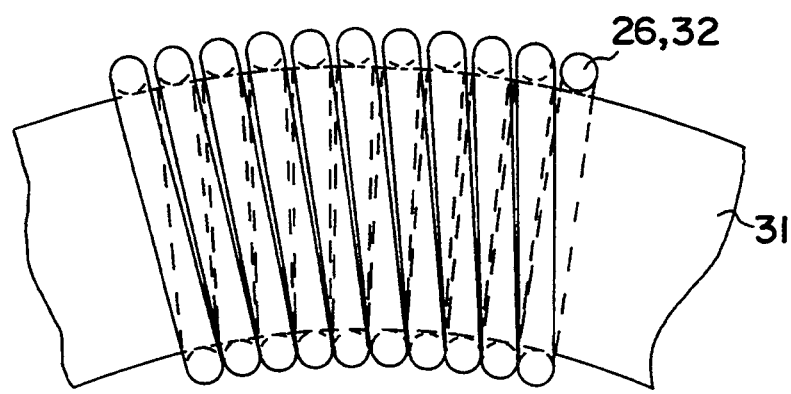
FIG. 5 depicts a partial side view of the welding element shown in FIG. 4.

FIGS. 4 and 5 depict an embodiment variant of a welding element 30 with an annular part 31 which is wound on all sides with a resistance wire 26, coated with plastics to form the heating coil 32.

Figure 6A:
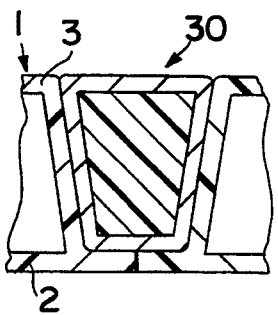
FIGS. 6A–6C depicts embodiment variants of welded joints in compound tubes according to FIGS. 1 and 2.
Figure 6B:
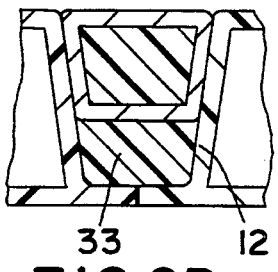
Figure 6C:
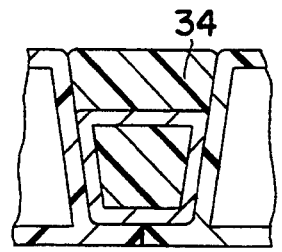

FIGS. 6A to 6C show the use of the welding element 30 for joining tubular parts 1 which are constructed with an inner tube 2 and an outer tube 3, as those in FIGS. 1, 2 described as compound tubes or corrugated tubes.

FIG. 6B shows, in addition to the welding element 30, an inner ring 33 which forms a lateral gap 12 before welding. An outer ring 34 is used for the embodiment shown in FIG. 6C.

Figure 7A:
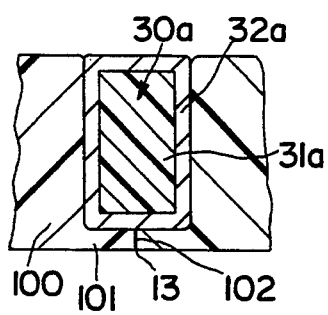
FIG. 7A–7C depict welded joints in thick-walled tubes.
Figure 7B:
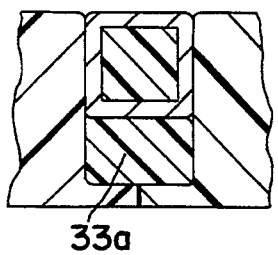
Figure 7C:
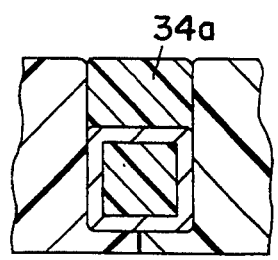

FIGS. 7A to 7C show the welding of thick-walled tubes 100 by means of welding elements 30a which have a heating coil 32a which is produced in accordance with FIGS. 4 and 5 by winding round an annular portion 31a, which is rectangular or square in cross-section. The ends of the tubes 100 are provided with a recess, thus forming a projection 101 with an inner end face 102.

Before welding there is a gap 13 between the ends 102, as already described in FIGS. 1 and 2. The welding occurs in the same way. FIG. 7B depicts the additional use of an inner ring 33a and FIG. 7C of an outer ring 34a.

Figure 9A:
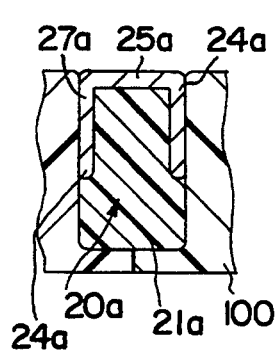
FIG. 9A, 9B depict embodiment variants of welding elements in the welded joints shown in FIG. 7.
Figure 9B:
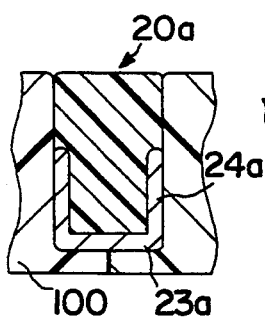

FIGS. 9A and 9B show the welding of thick-walled tubes 100 according to FIG. 7, with a welding element 20a as described similarly in FIGS. 1 to 3. In the embodiment shown in FIG. 9A, the coil strands 27a extend from one side face 24a over the outer peripheral surface 25a to the other side face 24a and, in the embodiment of FIG. 9B over the inner peripheral surface 23a. The annular part 21a preferably has a rectangular cross-section.

In addition FIGS. 8A, 8B, 8C, 10A and 10B show the welding of corrugated tubes 200 with arcuate corrugation valleys 201 and corrugation peaks 202. The welded joint is made in a corrugation valley 201 so that here the ends also form a projection 203 with inner end faces 204.

Figure 8A:
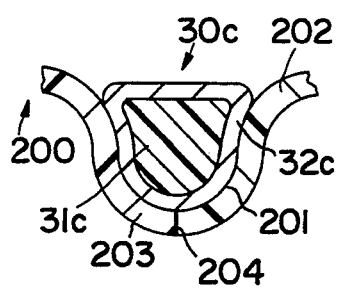
FIG. 8A–8C depict welded joints in corrugated tubes.
Figure 8B:
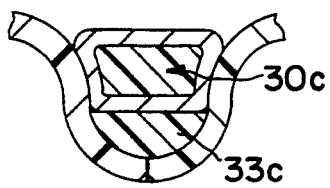
Figure 8C:
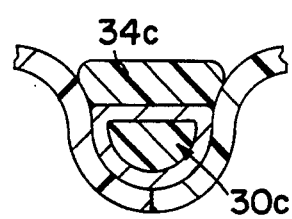

The welding elements 30C according to FIGS. 8A, 8B, 8C have heating coils 32C according to FIGS. 4, and 5. The cross-sections of the annular parts 31c are adapted to the shape of the corrugation valley 201.

According to FIG. 8B, an inner ring 33c is again used and according to FIG. 8C an outer ring 34c.

Figure 10A:
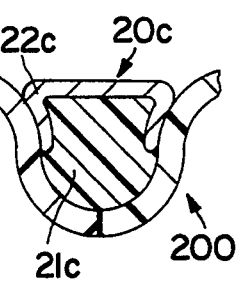
FIG. 10A, 10B depict embodiment variants of welding elements in the welded Joints shown in FIGS. 8.

In the embodiment depicted in FIGS. 10A and 10B, welding elements 20C are used, as described in connection with FIGS. 1 to 3. Here however, they have an annular part 21C adapted in cross-section according to the shape of the corrugation valley 201 and the heating coil 22c is appropriately curved.

Figure 10B:
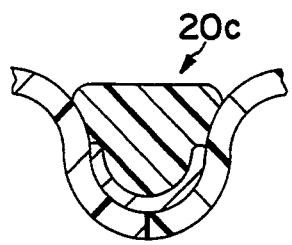

Also in the embodiment depicted in FIGS. 1 and 2, the heating coil 22 can be arranged on the inner peripheral surface 23 and over a part of the side surfaces 24, 25 of the conical annular part 21, as shown in a similar way to the embodiment depicted in FIGS. 9B and 10B.

While the preferred embodiments of the invention have been depicted in detail, modifications and adaptations may be made thereto, without departing from the spirit and scope of the invention, as delineated in the following claims:

What is claimed is:

1. A method for end welding of two tubular plastic parts having ends wherein said ends each have a projection with an inner end face extending from the inner circumference, providing the steps of:

providing a plastic welding element having an outer contour provided with a heating coil for electrical resistance heating applied between the ends of the tubular parts;

placing the two tubular parts onto the welding element with simultaneous mutual centering with the projections, a gap being formed between the projections;

supplying current to the heating coil in the plastic welding element at least in one partial region of adjacently lying surfaces of the tubular parts;

melting the welding element such that no melting of the inner end faces occurs;

pressing the tubular parts during heating against each other until the end faces act as a firm stop and abut each other;

switching off the current; and retaining the tubular parts next to each other until the welded region is hardened by cooling.

2. The method of claim 1, wherein said heating coil is formed by winding the entire outer contour by means of a resistance wire coated with plastics.

3. The method of claim 1, wherein said welding element comprises
an annular part made of
at least three peripheral sides.

4. The method of claim 3, wherein said heating coil has two coil parts connected in parallel to each other and have the same or approximately the same ohmic resistance and arranged on half the circumference of the annular part.

5. The method of claim 3, wherein said heating coil includes:
at least one resistance wire having coil strands wherein said wire is wound in a wavy or zig-zag manner and coated with plastics; and
coil strands extending transversely to the peripheral direction of the annular part from one side face over at least one of an outer or inner peripheral surface to the other side face of an annular part.

6. The method of claim 5, wherein said coil strands have return ends on the two side faces arranged spaced from the outer or inner peripheral surface of the annular part.

7. The method of claim 5, wherein said inner peripheral surface includes a centering seat for the two tubular parts to be joined.

8. The method of claim 5, wherein said annular part (21, 31) is of trapezoidal construction with a cross-section decreasing towards the inner circumference.

9. An apparatus for end welding of two tubular plastic parts having ends, wherein said ends each have a projection with an end face extending from the inner circumference, comprising:

a welding element with a heating coil for electrical resistance heating applied between the ends of the tubular parts, said welding element comprising:

an annular part made of plastics said annular part having at least three peripheral sides including an outer contour, said outer contour being provided with the heating coil.

10. The apparatus of claim 9, further comprising a resistance wire, wherein said heating coil is formed by winding entirely the outer contour by means of the resistance wire coated with plastics.

11. The apparatus of claim 9, wherein said heating coil has two coil parts connected in parallel to each other and have the same or substantially the same ohmic resistance and arranged on half the circumference of the annular part.

12. The apparatus of claim 9, wherein said heating coil includes:

at least one resistance wire having coil strands wherein said wire is wound in a wavy of zig-zag manner and coated with plastics; and coil strands extending tranversely to the peripheral direction of the annular part from one side face over an outer or the inner peripheral surface to the other side face of an annular part.

13. The apparatus of claim 12, wherein said inner peripheral surface includes a centering seat.

14. The apparatus of claim 12, wherein said coil strands have return ends on the two side faces arranged spaced from the the outer or inner peripheral surface of the annular part.

15. The apparatus of claim 12, wherein said annular part is of trapezoidal construction with a cross-section decreasing towards the inner circumference.

* * * * *